United States Patent
Aselage et al.

(10) Patent No.: US 9,829,099 B2
(45) Date of Patent: Nov. 28, 2017

(54) TRANSMISSION DRIVE MODE USER SELECTION SYSTEMS AND METHODS

(71) Applicant: Ford Global Technologies, LLC, Dearborn, MI (US)

(72) Inventors: Brandon M. Aselage, White Lake, MI (US); Jeffrey Singer, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 14/938,170

(22) Filed: Nov. 11, 2015

(65) Prior Publication Data

US 2017/0130829 A1    May 11, 2017

(51) Int. Cl.
| | |
|---|---|
| *F16H 61/22* | (2006.01) |
| *B62D 1/04* | (2006.01) |
| *F16H 59/08* | (2006.01) |
| *F16H 59/10* | (2006.01) |
| *F16H 59/04* | (2006.01) |
| *F16H 59/12* | (2006.01) |
| *F16H 59/02* | (2006.01) |
| *F16H 59/54* | (2006.01) |

(52) U.S. Cl.
CPC .............. *F16H 61/22* (2013.01); *B62D 1/046* (2013.01); *F16H 59/08* (2013.01); *F16H 59/105* (2013.01); *F16H 59/044* (2013.01); *F16H 59/10* (2013.01); *F16H 59/12* (2013.01); *F16H 59/54* (2013.01); *F16H 2059/0247* (2013.01)

(58) Field of Classification Search
None
See application file for complete search history.

(56) References Cited

U.S. PATENT DOCUMENTS

| | | | |
|---|---|---|---|
| 7,555,967 | B2 | 7/2009 | Terayama et al. |
| 8,666,617 | B2 | 3/2014 | Ajimoto et al. |
| 8,725,368 | B2 | 5/2014 | Pudvay |
| 8,996,261 | B2 | 3/2015 | Sata |
| 2006/0169085 | A1* | 8/2006 | Peuster ............ B60K 37/06 74/473.12 |
| 2008/0264190 | A1* | 10/2008 | Nishimura ............ F16H 61/22 74/335 |
| 2009/0189373 | A1* | 7/2009 | Schramm ............ B60K 35/00 280/731 |
| 2010/0100289 | A1* | 4/2010 | Tawara ............ F16H 61/0213 701/52 |
| 2014/0116178 | A1 | 5/2014 | Sata |
| 2015/0094921 | A1 | 4/2015 | Reichler |
| 2015/0321551 | A1* | 11/2015 | Hendry ............ B60K 20/06 701/62 |

\* cited by examiner

*Primary Examiner* — Justin Holmes
*Assistant Examiner* — Timothy Hannon
(74) *Attorney, Agent, or Firm* — James Dottavio; Brooks Kushman P.C.

(57) ABSTRACT

A vehicle includes a powertrain having a transmission capable of operating in a plurality of modes to propel the vehicle. The vehicle also includes a steering wheel first switch to receive user input indicative of a desired transmission operating mode. The vehicle further includes a controller programmed to in response to a user input at the steering wheel first switch while a brake is applied, cause the transmission to shift into a drive mode from a non-drive mode.

15 Claims, 3 Drawing Sheets

TRANSMISSION DRIVE MODE USER SELECTION SYSTEMS AND METHODS

TECHNICAL FIELD

The present disclosure related to a user interface to electronically shift transmission drive modes.

BACKGROUND

Transmissions enable a powertrain to operate in different modes depending on whether vehicle propulsion is desires, and the particular direction of propulsion if so desired. Selection of the transmission operating mode is often achieved by a user engaging a manual shift lever located at a center console or on a steering column. Mechanical transmission shifters occupy significant package space compared to electronic shift systems. Also, the location of user shift selection on a center console or instrument panel may detract from aesthetics and limit styling flexibility.

SUMMARY

According to aspects of the present disclosure, a vehicle includes a powertrain having a transmission capable of operating in a plurality of modes to propel the vehicle. The vehicle also includes a steering wheel first switch to receive user input indicative of a desired transmission operating mode. The vehicle further includes a controller programmed to in response to a user input at the steering wheel first switch while a brake is applied, cause the transmission to shift into a drive mode from a non-drive mode.

According to other aspects of the present disclosure, a vehicle includes a powertrain having a transmission capable of operating in a plurality of modes to propel the vehicle. The vehicle also includes a plurality of steering wheel switches to receive user input indicative of a desired transmission operating mode. The vehicle further includes a controller programmed to cause the transmission to shift into a park mode from a drive mode in response to a user input at a steering wheel second switch while the vehicle is not rolling.

According to further aspects of the present disclosure, a vehicle includes a powertrain having a transmission capable of operating in a plurality of modes to propel the vehicle. The vehicle also includes a plurality of steering wheel switches to receive user input. The vehicle further includes a controller programmed to cause the transmission to shift into a drive mode in response to a user input at a steering wheel first switch while the transmission is in a park mode and a user applies a brake. The controller is also programmed to cause the transmission to shift into a reverse mode in response to a user input at a steering wheel second switch while the transmission is in a park mode and a user applies a brake.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
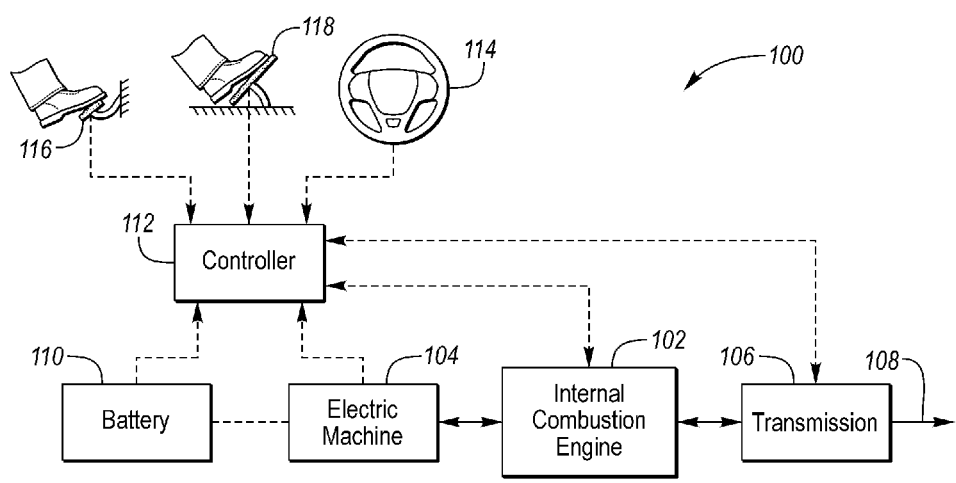
FIG. 1 is a schematic of a vehicle.

A representative hybrid electric vehicle 100 according to various embodiments is illustrated schematically in FIG. 1. The vehicle 100 includes an internal combustion engine 102 driveably connected to an electric machine 104, a transmission 106 having multiple output gear ratios, and output shaft 108. Elements are driveably connected when there is a mechanical power flow path between them to provide vehicle propulsion. The output shaft 108 may drive the vehicle wheels directly or indirectly, such as via a differential assembly, for example.

The electric machine 104 is electrically connected to exchange energy with traction battery 110. The electric machine 104 is also driveably connected to the output shaft 108. The electric machine 104 is a reversible electric machine that is capable of operating as a motor to convert electrical power from the battery 110 into rotational mechanical power to propel the vehicle. Additionally, the electric machine is capable of operating as a generator to convert rotational mechanical power into electrical power and provide energy to the battery 110. The terms generator and motor should be regarded merely as labels for ease of description and do not limit the function or operation of the electrical machine 104.

The power output of the engine 102 may not be constrained to be proportional to the speed of the output shaft 32 in this arrangement. Engine power output may be selected or controlled independently of vehicle speed by setting the output of the electric machine 104 accordingly. Power may flow from the engine 102 to the output shaft 32 through a combination of mechanical power transfers and electrical power transfers. During some operating conditions, the engine 102 may generate more power than is delivered to the output shaft 32 with the difference, neglecting efficiency losses, delivered to the traction battery 110. Under other operating conditions, the traction battery 110 in combination with electric machine 104 may supplement the power delivered by the engine 102 such that more power is delivered to the output shaft 32.

A controller 112 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU of controller 112. As generally illustrated in the representative embodiment of FIG. 1, the controller 112 may communicate with the engine 102, the electric machine 104, the traction battery 110, and the transmission 106. The controller accepts input signals indicating driver intention from a steering wheel 114, a brake pedal 116, and an accelerator pedal 118. The steering wheel 114 includes multiple user inputs to allow the driver to select Park, Reverse, Neutral, Drive, Sport or Low driving modes, for example. The steering wheel 114 also inputs to permit a driver to select an upshift or downshift gear ratios of the transmission 106. More specifically, the controller may receive signals indicative of the current transmission operation mode such that mode shifting responses to user input may be based at least in part on the current transmission operating mode.

The vehicle of the present disclosure may include electronic mode shifting of the transmission as opposed to direct mechanical linkages actuated by the user. Transmission mode selection may achieved by actuating one or more switches which provide a signal to controller 112. The controller 112 in turn issues a signal to an actuator in mechanical connection with the transmission 106 to cause a change in the transmission operating mode. Electronic mode shifting improves passenger compartment package space by eliminating mechanical linkages required to extend to the reach of the user. For example, a stick shift stalk commonly located in the center console may be replaced by switches located at any number of places. Furthermore, different switch configurations may be achieved between different vehicles while employing a common transmission mode shift actuator. According to aspects of the present disclosure, a plurality of switches is disposed on the steering wheel to allow a user to provide input to cause a shift in a transmission mode.

A driver of the vehicle may provide input for a demanded powertrain output torque or power for the vehicle via accelerator pedal 118. In general, depressing or releasing the accelerator pedal 118 generates an accelerator pedal input signal that may be interpreted by the controller 112 as a demand for increased power or decreased power, or a demand for increased output torque or decreased output torque. Based at least upon input from the accelerator pedal 118, the controller 112 may control the speed and torque of the engine 102 and/or the electric machine 104 to satisfy the torque or power demanded by the driver.

Other vehicle configurations may benefit from aspects of the present disclosure. In addition to illustrating a hybrid vehicle, FIG. 1 can be representative of a battery electric vehicle (BEV) configuration if the engine 102 is removed. FIG. 1 could also represent a conventional vehicle having the internal combustion engine 102 as the sole propulsion source. Such a conventional vehicle may not include an electric machine 104 or traction battery 110 to provide vehicle traction.

Figure 2:
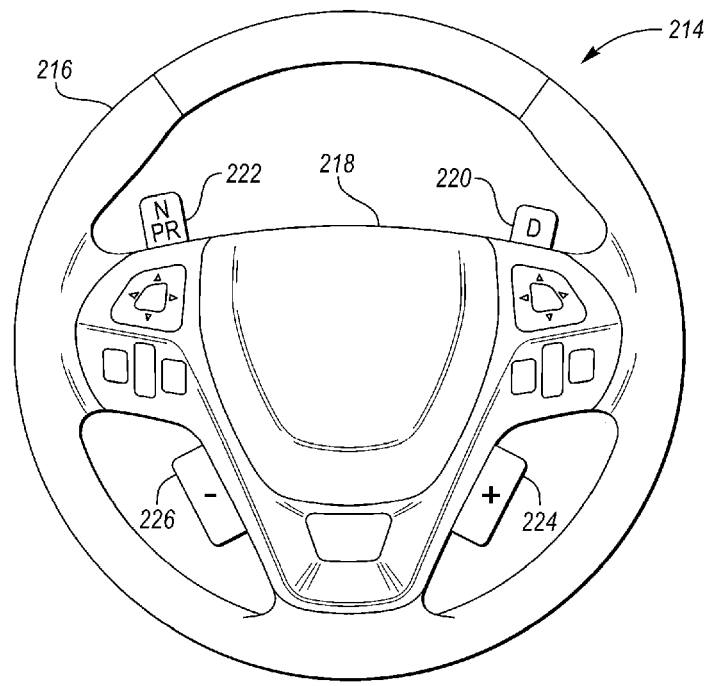
FIG. 2 is a schematic of a steering wheel having a plurality of user interfaces for transmission mode shift inputs.

Still referring to FIG. 2, controller 112 is illustrated as a single controller, but may be part of a larger control system and communicate with and/or be influenced by various other controllers throughout the vehicle, such as a vehicle system controller (VSC). Examples of such other controllers that may be communicate with the controller 112 include a brake system control module (BSCM), a high voltage battery controller (BECM), as well as other controllers responsible for various vehicle functions or subsystems. One or more controllers are collectively referred to as a "controller" that commands various actuators in response to signals from various sensors.

The controller 112 response may serve to dictate or influence a number of vehicle functions such as starting/stopping engine 102, operating the electric machine 104 to control the engine speed relative to the vehicle speed and/or recharge the traction battery 110, etc. The controller 112 may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The devices or functions represented by the flow chart blocks may be performed by software and/or hardware. Depending upon the particular processing strategy, such as event-driven, interrupt-driven, etc., the various functions may be performed in an order or sequence other than illustrated in the Figures. Similarly, one or more steps or functions may be repeatedly performed, or omitted, although not explicitly illustrated. In one embodiment, the functions illustrated are primarily implemented by software, instructions, or code stored in a non-transitory or persistent computer readable storage medium and executed by a microprocessor-based computer or controller, such as represented by controller 112 (FIG. 1), to control operation of the vehicle.

Referring to FIG. 2 a steering wheel 214 is schematically depicted according to aspects of the present disclosure. The steering wheel 214 includes an outer rim portion 216 for convenient grip by a driver. A hub portion 218 of the steering wheel 214 may include a number of different user controls for vehicle function. A first switch 220 and a second switch 222 are provided to receive user input for controlling a mode of operation of the transmission. The first switch corresponds to drive modes of the transmission and may include a "D" icon to inform the driver of the corresponding functions. The second switch 222 corresponds to the neutral mode, park mode, and reverse mode of the transmission, and may include a "NPR" icon to inform the drive of the corresponding functions.

According to aspects of the present disclosure, the progression of transmission mode shifting corresponding to the second switch occurs in a terminal sequence. That is, a first user input of the second switch prompts a shift into neutral mode. A subsequent second user input prompts a switch into park mode. A third user input to the second switch causes a shift into reverse mode. Additional user inputs at the second switch may cause no further transmission shifting actions. User input to the first switch would then be required to cause a shift out of reverse mode. The N-P-R terminal sequence progression of input to the second switch may help reduce inadvertent overshooting of the desired transmission mode by providing only three steps having a stop point at the end. A user would affirmatively provide input at the first switch in order to reset the sequence of modes activated by the second switch.

Alternatively, the progression of transmission mode shifting corresponding to the second switch occurs in a repeating cyclical sequence. In this case each subsequent user input at the second switch causes continued shifting through the transmission modes corresponding to the N-P-R cycle. In this way, a user would be able to cause a shift out of the reverse mode into the neutral mode by providing input to the second switch. A repeating cyclical sequence may provide greater ease of use by a driver, however the driver may need to be more cognizant of the overshooting the desired transmission mode to avoid have to unnecessarily loop through the transmission mode cycle activated by the second switch.

The steering wheel 214 also includes a third switch 224 and a fourth switch 226. The third switch 224 and fourth switch 226 correspond to shifting of the transmission gear ratio in a manual shift mode. As discussed in more detail below, the user can provide input to cause the transmission to enter manual mode. The third and fourth switched allow the user to selectively prompt an upshift and a downshift of the transmission gear ratio, respectively. The third and fourth switches are provided with a symbol indicative of a downshift and/or upshift. Such as, "−" or "v" indicating a downshift and "+" or "Λ" indicating an upshift.

Figure 3A:
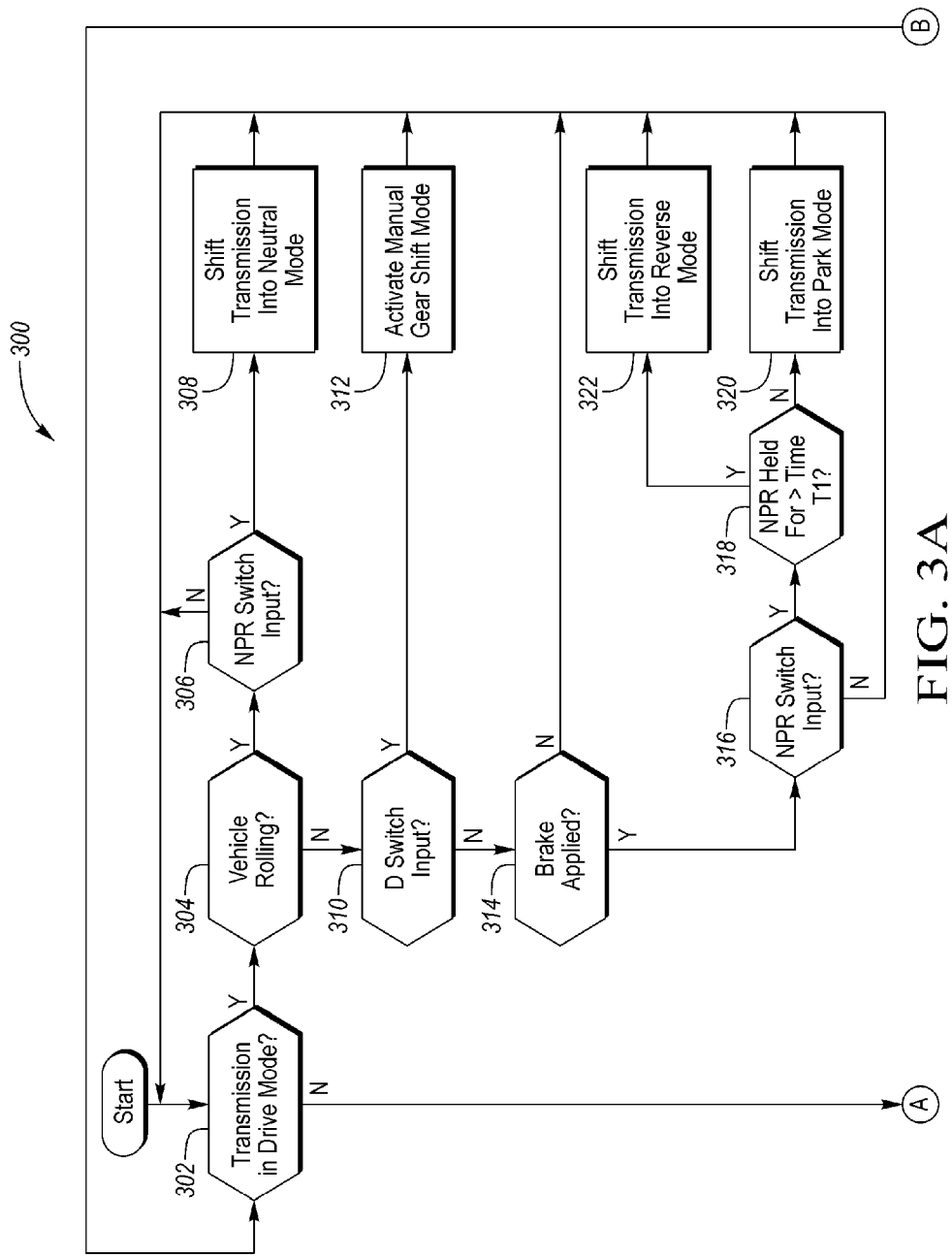
FIGS. 3A and 3B are a flowchart of an algorithm for controlling transmission mode shifts based on user input at a steering wheel.
Figure 3B:
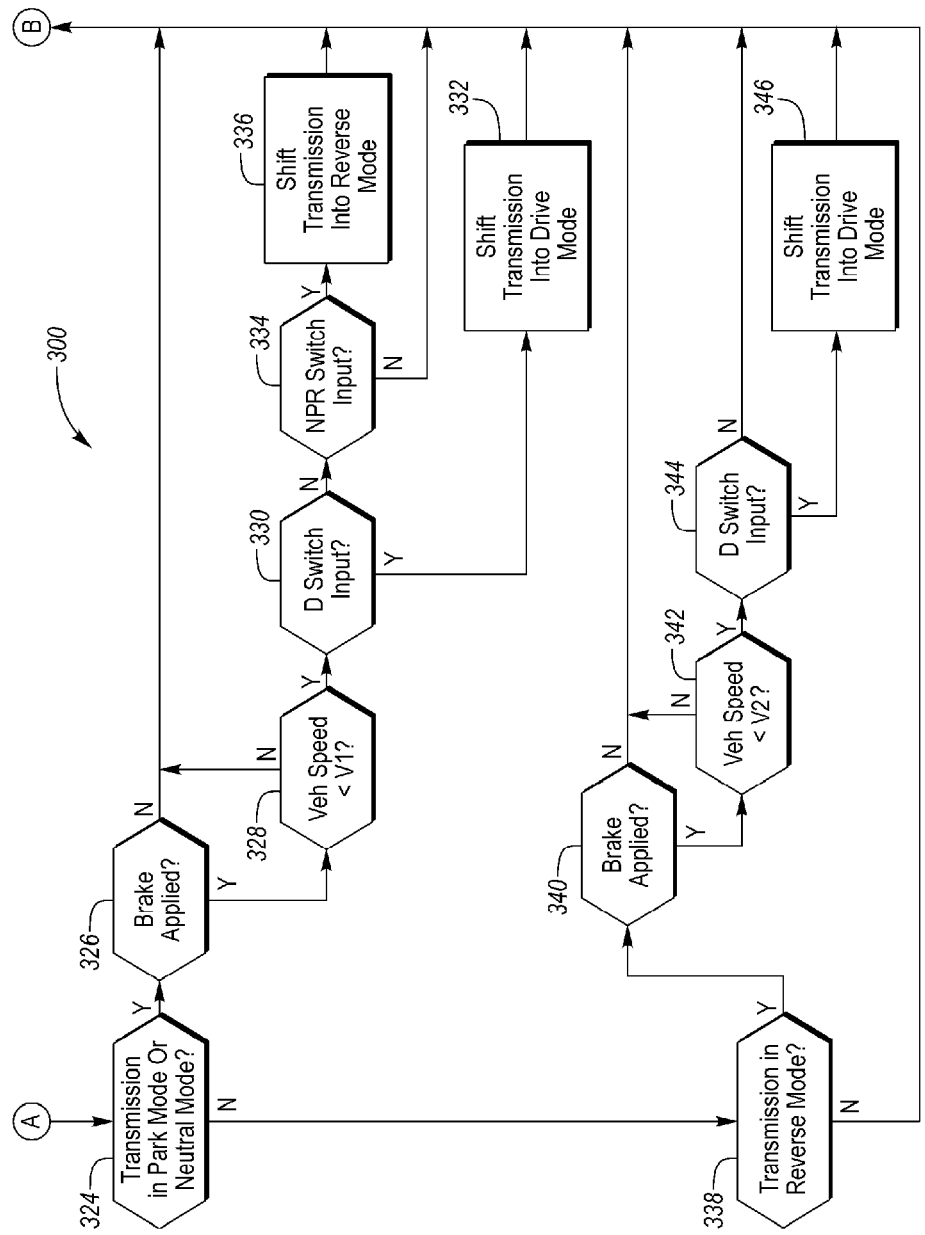

FIG. 3 is a flowchart depicting a method 300 of controlling the mode of operation of the transmission depending on the user input, the current mode of operation, and the state of the vehicle. The controller initially determines the current mode of operation of the transmission. At step 302 the controller determines whether the transmission is in drive mode. If in drive, the controller determines at step 304 whether the vehicle is rolling prior to considering input at either of the mode switching paddles. If the vehicle is rolling at step 304, the controller may restrict inputs accepted and only respond to input from the NPR switch at step 306. In this case driver input at the NPR switch may cause the controller to issue a command at step 308 for the transmission to shift from the drive mode into the neutral mode.

If at step 304 the vehicle not rolling controller may enter a different portion of the algorithm enabling different transmission mode switching operations. At step 310 if the provides input at the D switch while the vehicle is in driver mode and not rolling, the controller issues a command at step 312 to cause the transmission to enter manual gear shift mode. In this manual shifting mode, the driver may be able to manually cause the transmission to upshift to a higher gear ratio or downshift to a lower gear ratio irrespective of a standard predetermined shift schedule. In at least one embodiment, a "+" switch is provided to cause upshifting and a "−" switch is provided to cause downshifting.

If at step 310 no driver input is provided at the D switch, the controller may consider whether the driver has applied the brake prior to considering input at the NPR switch. If at step 314 the driver has applied the brake while the transmission is in drive mode and not rolling, the controller may consider inputs at the NPR switch at step 316. If the driver provides input at the NPR switch at step 316, the controller may consider additional characteristics of the driver input to determine the transmission mode selection. According to an aspect of the present disclosure, the duration over which the NPR switch is held is used to dictate the transmission mode shift. If at step 318 the NPR switch is held for a short duration, less than a predetermined time T1, the controller issues a command at step 320 to cause the transmission to shift into park mode.

If at step 318 the NPR switch is held for a longer duration, greater than the predetermined time T1, the controller issues a command at step 322 to cause the transmission to shift into reverse mode. Although time duration is disclosed in the flowchart of FIG. 3, other characteristics may be used to distinguish different driver inputs to the NPR switch. According to other aspects of the present disclosure, the controller may selects whether to enter park mode or reverse mode from drive mode based on a single user input at the switch versus a double user input, respectively.

Each of the D switch and the NPR switch cause different transmission responses when receiving driver input while the transmission is in non-drive modes. Referring back to step 302, if the transmission is not in drive mode, the controller determines whether the transmission is in park mode at step 324. If the transmission is in either park mode or neutral mode at step 324 the controller may use the application of the brake as a prerequisite at step 326 regarding whether to respond to input at the D switch or the NPR switch. If the brakes are applied at step 326 the controller may determine at step 328 whether the vehicle speed is less than a predetermined threshold V1. It may be undesirable to shift transmission modes during a condition where vehicle speed is sufficiently great. If vehicle speed is greater than V1 at step 328 the controller may disregard user input provided to the first and second switches and return to step 302.

If vehicle speed is less than V1 at step 328, the controller assesses at step 330 whether the driver has provided input to the D switch. If driver input is provided at the D switch, the controller issues a command at step 332 to cause the transmission to shift into drive mode.

If no input is provided at the D switch at step 330, the controller determines whether there has been driver input to the NPR switch at step 334. If driver input is provided to the NPR switch at step 334, the controller issues a command at step 336 to cause the transmission to shift into reverse mode. If no input is provided at the D switch at step 330 or the NPR switch at step 334, the controller may take no action and return to step 302.

If the transmission is neither in drive mode, park mode, nor neutral mode at step 324, the controller determines at step 338 whether the transmission is in a reverse mode. The portion of the control algorithm corresponding to the transmission initially being in reverse mode differs from those sections corresponding to other initial modes. If the transmission is in reverse mode at step 338 the controller determines whether there is a driver application of the brakes at step 340. The application of the brake may be considered a prerequisite to the controller accepting input from the transmission mode selection switches. If the brakes are applied at step 340, the controller determines at step 342 whether the vehicle speed is sufficiently low to shift out of reverse mode. If the vehicle speed is greater than speed threshold V2 at step 342 the controller may disregard user input and return to step 302.

If vehicle speed is less than V2 at step 342 the controller assesses at step 344 whether there is driver input to the D switch. In response to the driver input to the D switch while the vehicle is in reverse with the brake applied, the controller issues a command at step 346 to cause the transmission to enter the driver mode. It should be appreciated that when the transmission is initially in the reverse mode, no additional input at the NPR switch causes additional responses at the controller. That is, the controller does not cause a transmission mode switch in response to driver input to the NPR switch when the transmission is in the reverse mode.

Each of the above portions of the algorithm of method 300 is performed in a looping fashion so as to continually monitor the transmission mode and poll for driver input at the transmission mode selection switches.

A switch priority algorithm may be provided at the controller such that if multiple switches are depressed simultaneously, the controller may disregard both commands and prompt a display message on the instrument panel indicating an error. The message informs the user of the error state and that no transmission mode shift has occurred. According to an aspect of the disclosure, if more than one switch is depressed within a minimum predetermined time threshold, the controller disregards the commands prompted by both switches and issues an error message to the driver. In such a case, the transmission will not shift gears until the driver inputs the mode switch commands in a more deliberate fashion having a time delay between the inputs. In at least one embodiment, the controller will disregard a switch input which is input within 2 seconds of a prior switch input. One exception discussed above includes a double user input of the NPR switch to shift into reverse mode from drive mode.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a powertrain having a transmission defining a plurality of operating modes to propel the vehicle; and
   a controller programmed to respond to user input at a steering wheel first switch by causing the transmission to shift into a drive mode from a non-drive mode when a brake is applied and by entering a manual gear shift mode when the vehicle is rolling at a speed greater than a threshold.

2. The vehicle of claim 1 wherein the controller is further programmed to cause the transmission to shift into a park mode in response to a single user input at a steering wheel second switch while the transmission is in the drive mode and the vehicle is not rolling.

3. The vehicle of claim 1 wherein the controller is further programmed to cause the transmission to shift into a reverse mode in response to a double user input at a steering wheel second switch while the transmission is in the drive mode and the vehicle is not rolling.

4. The vehicle of claim 1 wherein the controller is further programmed to cause the transmission to shift into a reverse mode in response to a steering wheel second switch being held for longer than a time threshold while the transmission is in the drive mode and the vehicle is not rolling.

5. The vehicle of claim 1 wherein the controller is further programmed to cause the transmission to shift into a reverse mode in response to an input at a steering wheel second switch while the transmission is in a park mode and the brake is applied.

6. The vehicle of claim 1 wherein the controller is further programmed to cause the transmission to shift into a neutral mode in response to an input at a steering wheel second switch while the transmission is in the drive mode and the vehicle is rolling without application of the brake.

7. A vehicle comprising:
   a powertrain having a transmission; and
   a controller programmed to respond to user input at a steering wheel second switch while the vehicle is stationary in a drive mode by causing the transmission to shift into a reverse mode if the switch is held for longer than a threshold and causing the transmission to shift into a park mode otherwise.

8. The vehicle of claim 7 wherein the controller is further programmed to cause the transmission to shift into the reverse mode in response to an input at the steering wheel second switch while the transmission is in the park mode and a brake is applied.

9. The vehicle of claim 7 wherein the controller is further programmed to cause the transmission to enter a manual gear shift mode in response to a user input at a steering wheel first switch while the vehicle is rolling at a speed greater than a threshold speed such that a user can selectively upshift and downshift a gear ratio of the transmission.

10. The vehicle of claim 9 wherein the controller is further programmed to, in response to a user input at a steering wheel third switch while the transmission is in the manual gear shift mode, cause the transmission to downshift to a lower gear ratio, the controller being further programmed to, in response to a user input at a steering wheel fourth switch while the transmission is in the manual gear shift mode, cause the transmission to upshift to a higher gear ratio.

11. A vehicle comprising:
    a powertrain having a transmission defining a plurality of operating modes to propel the vehicle; and
    a controller programmed to,
       while the transmission is in a park mode and a user applies a brake, (i) cause the transmission to shift into a drive mode in response to a user input at a steering wheel first switch, and (ii) cause the transmission to shift into a reverse mode in response to a user input at a steering wheel second switch, and
       while the transmission is in the drive mode and the vehicle is not rolling, cause the transmission to shift into the reverse mode in response to the steering wheel second switch being held for longer than a time threshold.

12. The vehicle of claim 11 wherein the controller is further programmed to, while the transmission is in the drive mode and the vehicle is rolling without a user application of the brake, cause the transmission to shift into a neutral mode in response to a user input at the steering wheel second switch.

13. The vehicle of claim 11 wherein the controller is further programmed to, while the transmission is in the drive mode and the vehicle is not rolling and a user applies the brake, cause the transmission to shift into the park mode in response to a user input at the steering wheel second switch.

14. The vehicle of claim 11 wherein the controller is further programmed to, while the transmission is in the drive mode and the vehicle is rolling at a speed greater than a threshold, cause the vehicle to enter a manual gear shift mode in response to a user input at the steering wheel first switch.

15. The vehicle of claim 14 wherein the controller is further programmed to, in response to a user input at a steering wheel third switch while the transmission is in the manual gear shift mode, cause the transmission to downshift to a lower gear ratio, the controller being further programmed to, in response to a user input at a steering wheel fourth switch while the transmission is in the manual gear shift mode, cause the transmission to upshift to a higher gear ratio.

\* \* \* \* \*